Aug. 25, 1936.　　C. H. HAPGOOD　　2,052,398
CHURN
Filed Aug. 26, 1935　　3 Sheets-Sheet 1

FIG. I.

WITNESS:

INVENTOR
Cyrus Howard Hapgood
BY
ATTORNEYS

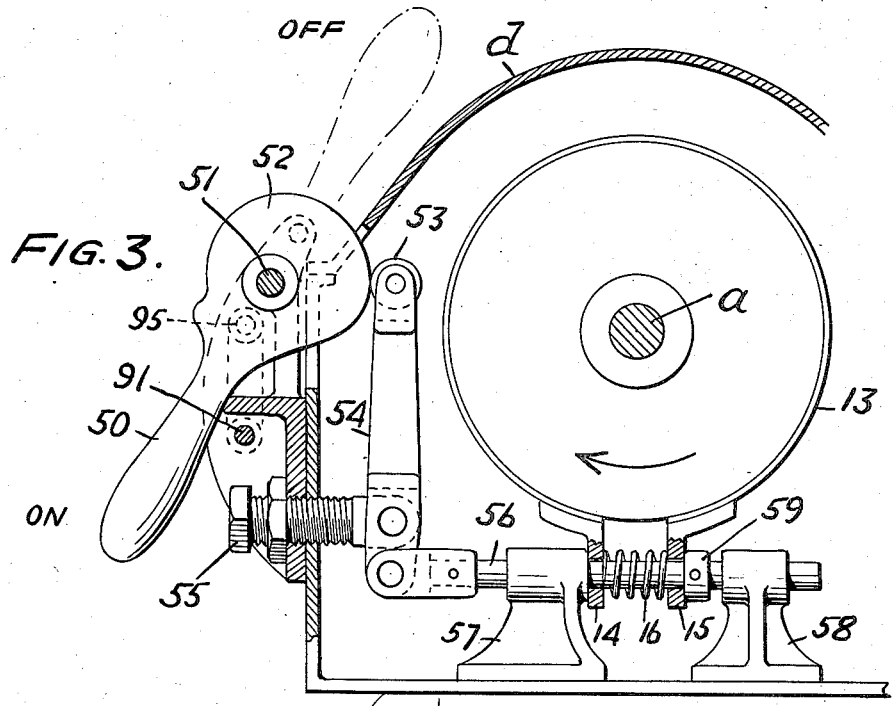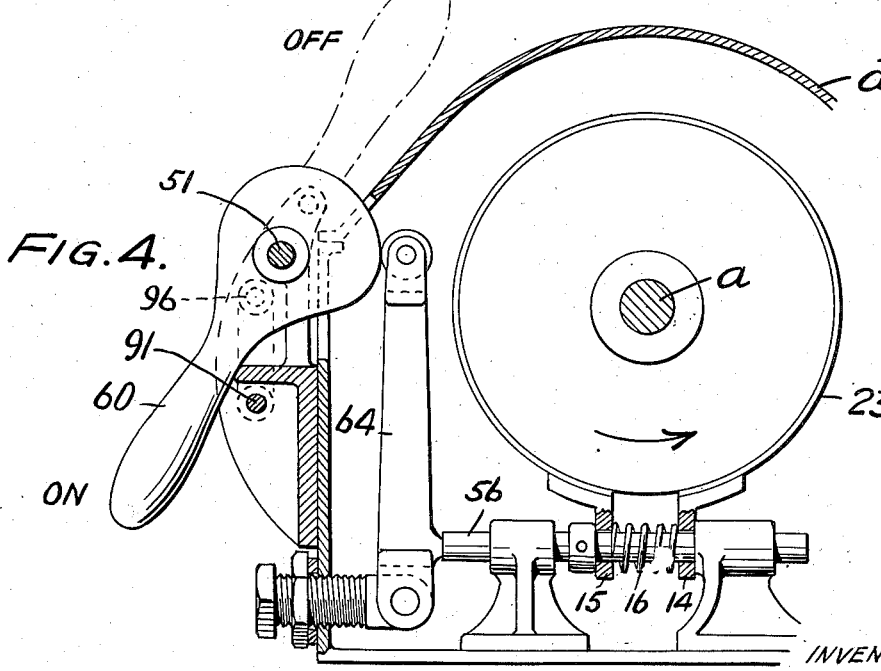

Patented Aug. 25, 1936

2,052,398

UNITED STATES PATENT OFFICE 2,052,398

CHURN

Cyrus Howard Hapgood, Nutley, N. J., assignor, by mesne assignments, to The De Laval Company, Limited, Peterboro, Ontario, Canada, a corporation of Canada Application August 26, 1935, Serial No. 37,896

8 Claims. (Cl. 31—33)

My invention relates to churns for making butter and more specifically to mechanism for selectively operating the churning and working means. The ordinary butter churn, to which my invention is applicable, comprises a churn barrel which is rotatable comparatively rapidly during the butter churning operation and which, after the churning operation is completed and the buttermilk withdrawn, is operable comparatively slowly during the butter working operation. During the working operation a series of working rolls within the churn is operated.

In the invention planetary gearing is interposed between the driving shaft on the one hand and the barrel and the rolls operating shaft on the other hand. The planetary gearing includes a series of brake wheels which, by means of a series of brake levers, may be held stationary, or released to enable them to partake of the movement of the planetary gearing. In the embodiment of the invention set forth herein, there are four brakes. When the churning brake is applied, the planetary gearing is caused thereby to give the desired high speed rotation to the churn barrel. When the working brake is applied, the planetary gearing is caused thereby to impart a slow rotation to the barrel. When the rolls brake is applied, the planetary gearing is caused thereby to operate the rolls shaft. When the other brake, which may be designated the main or control brake, is applied, the planetary gearing is rendered inoperative to rotate the barrel.

The invention also comprises means whereby it is rendered impossible to simultaneously apply the churning brake and the working brake, whereby neither of these brakes can be applied when the main brake is applied and whereby the main brake cannot be applied until both the churning brake and working brake are released. The invention also comprises novel mechanism whereby each brake lever is operable to apply the corresponding brake band.

In the drawings, which disclose a preferred embodiment of the invention—

Fig. 3 is a side view of either of two of the brake-operating devices looking in the direction of arrows 3, Fig. 2.

Fig. 4 is a side view of either of the other two brake-operating devices looking in the direction of the arrows 4, Fig. 2.

Figure 1:
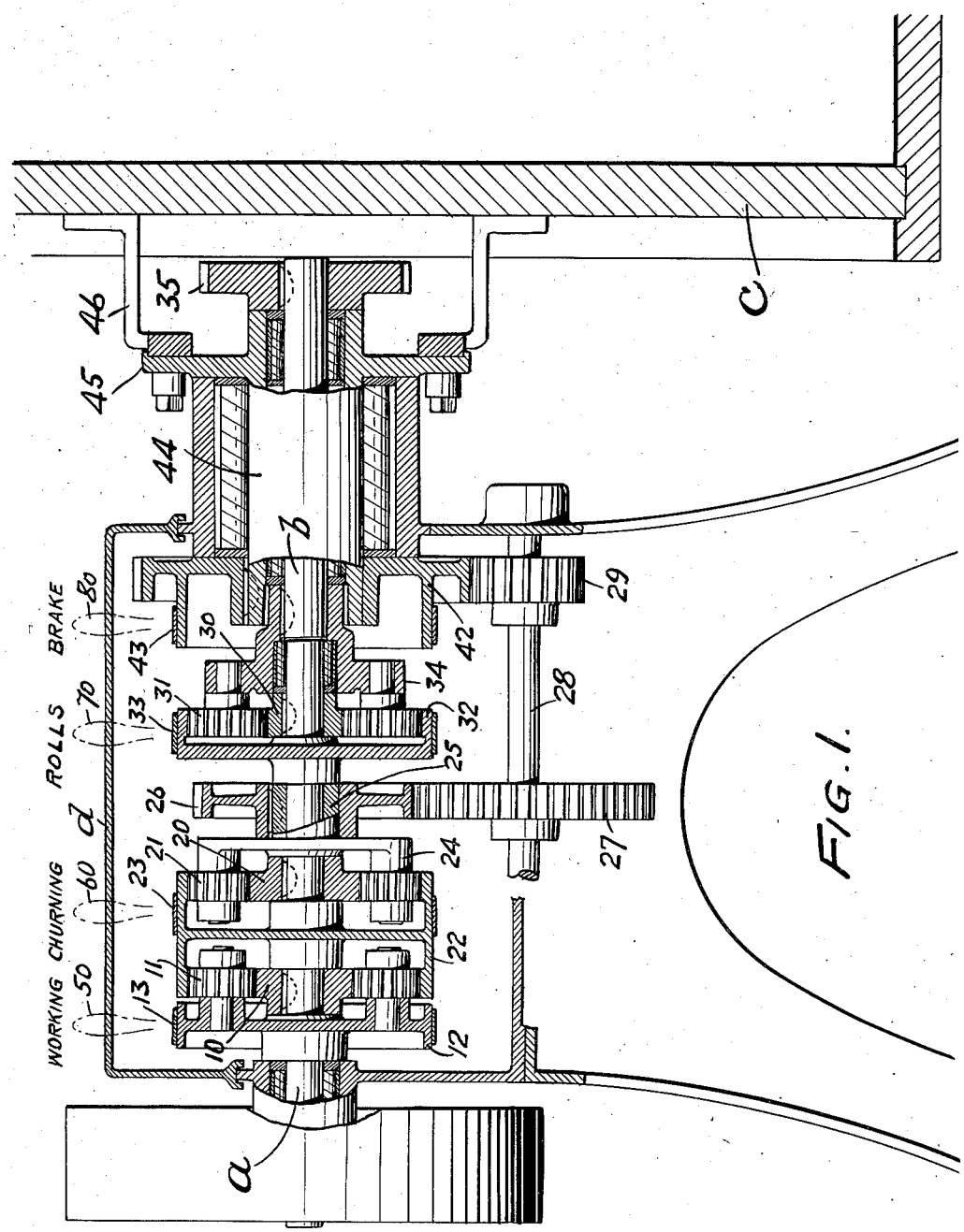
Fig. 1 is a horizontal sectional view of the planetary gearing for operating the churn barrel and the working rolls shaft.

The driving shaft $a$ has keyed thereto pinions 10, 20 and 30. Pinion 10 meshes with a series of planetary gears 11 mounted on a spider which carries a "working brake wheel" 12.

Pinion 20 meshes with a series of planetary gears 21. Gears 11 and 21 mesh with an internal gear on a "churning brake wheel" 22.

The shafts of gears 21 are carried on a spider 24 which has a hub 25 sleeved on the driving shaft $a$. To hub 25 is keyed a gear wheel 26 meshing with a gear wheel 27 on a back shaft 28, which also carries a pinion 29 that meshes with an external gear on a brake wheel 42.

Pinion 30 meshes with a series of planetary gears 31 that mesh with an internal gear on a "rolls brake wheel" 32.

Brake wheel 42 is keyed to a sleeve 44 which turns in roller bearings on a roll or gudgeon shaft $b$ in axial alignment with driving shaft $a$. Sleeve 44 has an annular web 45 to which is secured a spider 46 that carries the churn barrel $c$.

Gears 31 are carried by a spider 34 that is turnable on a roller bearing on driving shaft $a$ and is keyed to shaft $b$. Shaft $b$ at its other end carries a gear wheel 35 which has the usual driving connections (not shown) to the usual rolls (not shown) within the churn.

Brake bands 13, 23, 33 and 43 engage wheels 12, 22, 32 and 42 respectively and are applied and released by the operation of levers 50, 60, 70 and 80 as hereinafter specifically described.

In starting the operation of the churn only the brake band 23 is applied, locking the brake wheel 22. The series of planetary gears 21 and spider 24 then rotate bodily on the axis of shaft $a$. Through the chain of gears 26, 27 and 29, brake wheel 42 is rotated, and, with the latter, sleeve 44 and spider 46, thereby bodily rotating the churn barrel $c$. The gearing ratio is such that with the driving shaft $a$ rotating at 300 R. P. M. the churn barrel will rotate at 30 R. P. M.

After the churning operation is completed, brake band 23 is released and brake band 43 is applied. As hereinafter described, this prevents the application of brake bands 13 and 23.

After drawing off the buttermilk, brake band 43 is released and brake bands 13 and 33 are applied. Wheel 32 being held stationary by the application of brake band 33, planetary gears 31 rotate bodily around the axis of shaft $a$, thus rotating spider 34 and shaft $b$ at the rate of 73 R. P. M.; gear 35 on shaft $b$ thereby (through the usual driving connections [not shown] to the usual rolls [not shown] within the churn) driving such rolls in the customary way. Wheel 12 being held stationary by the application of brake band 13, the churn barrel will have imparted to it a comparatively slow movement of rotation, namely, about 2 R. P. M.

At the conclusion of the churning operation, brake bands 13 and 33 are released and brake band 43 is applied, which stops the rotation of the barrel.

Figure 2:
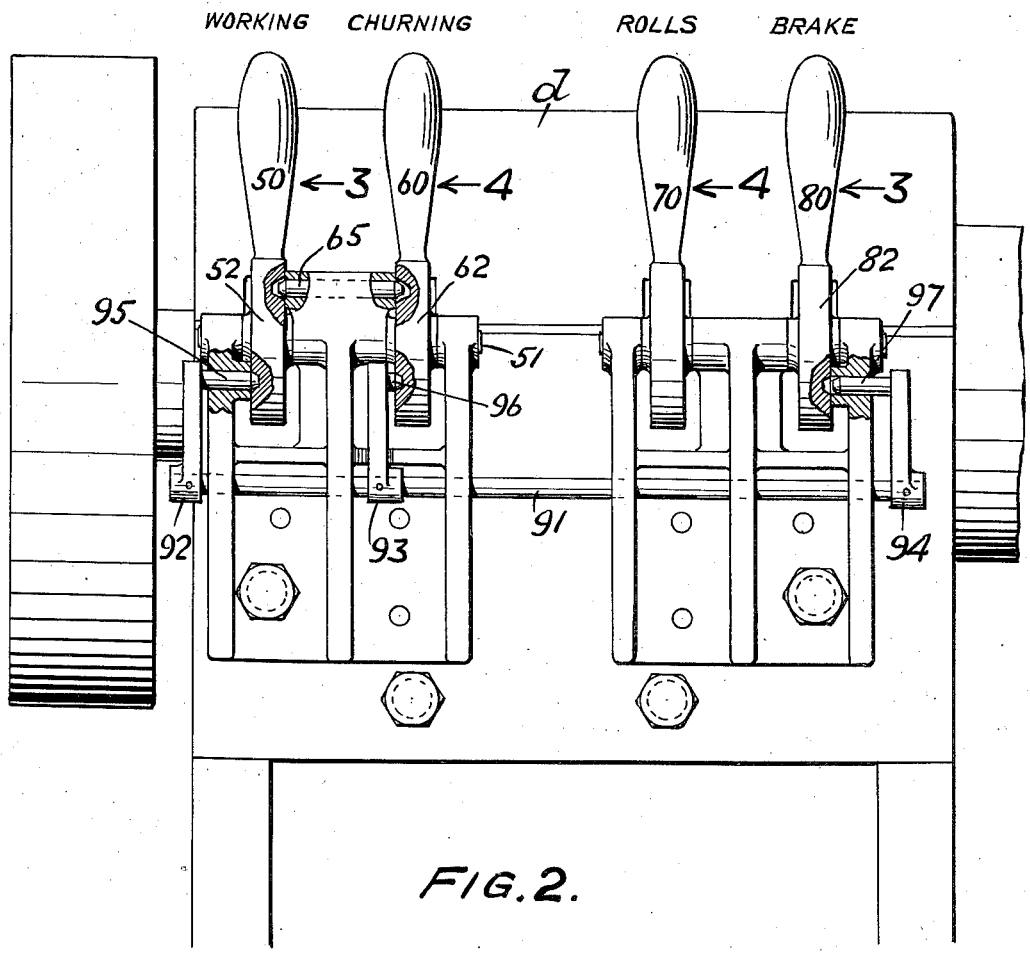
Fig. 2 is an elevational view of the interlocking mechanism between the brake operating levers.

Not only should the various brake bands be applied and released in the sequence specified in order to effect the churning, stopping, working and stopping in the sequence specified, but it is important to guard against the simultaneous application of the working brake and the churning brake or the application of the churning brake or working brake when the main brake is applied, or the application of the main brake when either the working brake or the churning brake is applied. In Figs. 2, 3 and 4, means are disclosed whereby the application of the working brake locks the churning brake, the application of the churning brake locks the working brake, the application of the main brake locks both the churning brake and the working brake, and the application of either the churning brake or the working brake locks the main brake.

The several brake bands 13, 23, 33 and 43 are operated respectively by levers 50, 60, 70 and 80 (see Fig. 2). The brake-application means operated by levers 50 and 80 (shown in Fig. 3) are the same and the slightly different brake-application means operated by levers 60 and 70 (shown in Fig. 4) are the same.

In Fig. 3 the hub of lever 50, pivoted on shaft 51, carries a cam 52 engaging a roller 53 on the upper end of a lever 54 of the first class, fulcrumed on a bolt 55 threaded in the frame d of the machine. The lower end of lever 54 is pivotally connected to a rod 56 slidable in bearings in standards 57, 58. The opposite ends of brake band 13 carry ears 14, 15 sleeved on rod 56 between the standards. A collar 59 is secured to the rod between ear 15 and standard 58. A coil spring 16, surrounding rod 56 between ears 14 and 15, tends to move collar 59 and rod 56 to the right, thereby releasing the brake band 13. When lever 50 is moved to the position shown in broken lines, cam 52 recedes from roller 53, thereby allowing spring 16 to operate to release the brake band. But when lever 50 is moved to the position shown in full lines, lever 54 is swung into position to pull rod 56 to the left; collar 59, through ear 15, compressing spring 16 and applying the brake band.

The construction shown in Fig. 4 for operating the brake band 23 (or 33) is the same as that shown in Fig. 3 and identical parts are similarly numbered. In this construction lever 64, operated by lever 60, is a lever of the second class and, in the application of the brake, rod 56 is pushed to the right.

The difference in construction between Figs. 3 and 4 is due to the fact that wheels 12 and 42, on the one hand, and wheels 22 and 32, on the other hand, rotate in opposite directions and it is desirable to tighten the brake band in the direction of rotation of the wheel; while it is desirable to have the four brake applying and releasing levers operable, in the application of the brakes, in the same direction.

In Fig. 2 all the brake applying and releasing levers 50, 60, 70 and 80 are shown in position to release their brakes. Slidable in the frame carrying the shaft 51 on which levers 50 and 60 are mounted is a pin 65 having bevelled or tapered ends which just enter recesses in opposite side faces of the cams 52 and 62 carried by these levers. When the churning brake lever 60 is moved from the position shown in Fig. 2 (corresponding to the broken line position shown in Fig. 4) toward the full line position shown in Fig. 4, pin 65 is moved to the left, causing it to penetrate further into the recess in the working brake lever 50 and locking this lever from movement into brake applying position. When the churning brake lever 62 is returned to the position shown in Fig. 2 and the working brake lever 50 is moved toward the full line position shown in Fig. 3, pin 65 is moved to the right, forcing it into locking relation with the churning brake lever. Thus neither of these levers is operable to brake if the other lever is in braking position.

Slidable in the machine frame is a long rod 91 carrying arms 92, 93 and 94 from which project respectively pins 95, 96 and 97 having bevelled or tapered ends adapted to engage recesses in the side faces of the cams 52, 62 and 82 carried by the hubs of the respective levers 50, 60 and 80. In the position of the parts shown in Fig. 2 any of these levers are operable into braking position. If, however, braking lever 80 should be moved toward braking position, rod 91 is locked from moving to the left, thereby locking the working and churning brake levers from movement into braking position. When braking lever 80 is returned to the position shown in Fig. 2, the movement of either working lever 50 or churning lever 60 toward braking position shifts rod 91 to the left, causing pin 97 to enter into locking engagement with lever 80. Thus neither the working lever 50 or the churning lever 60 is operable to brake until brake lever 80 is returned to non-braking position, and brake lever 80 is inoperative to brake until both the churning lever 60 and the working lever 50 are returned to non-braking positions.

What I claim and desire to protect by Letters Patent is:

1. In a churn, the combination with the churn barrel, a driving shaft and power transmission mechanism connecting the driving shaft with the churn barrel, said mechanism including planetary gearing and three brake wheels, two of which are adapted when held from rotation to thereby effect rotation of the churn barrel at different speeds during churning and working respectively and the third of which is adapted when held from rotation to prevent the rotation of the churn barrel.

2. In a churn, the combination with the churn barrel, a driving shaft, a rolls-operating shaft and power transmission mechanism connecting the driving shaft with the churn barrel and with the rolls-operating shaft, said mechanism including planetary gearing and four brake wheels, two of which are adapted to be held stationary to thereby effect the rotation of the churn barrel at different speeds during churning and working respectively, the third of which is adapted to be held stationary to thereby rotate the rolls-operating shaft and the fourth of which is adapted to be held stationary to prevent the rotation of the churn barrel.

3. In a churn, the combination with the churn barrel, a driving shaft and power transmission mechanism connecting the driving shaft with the churn barrel, said mechanism including planetary gearing and two brake wheels which are adapted when held from rotation to thereby effect rotation of the churn barrel at different speeds during churning and working respectively, a brake for each wheel, means to operate each brake and an interlocking device between the churning brake-operating means and the working brake-operating means adapted to lock either means from movement to braking position when the other is in braking position.

4. In a churn, the combination with the churn barrel, a driving shaft and power transmission mechanism connecting the driving shaft with the churn barrel, said mechanism including planetary gearing and two brake wheels one of which is adapted when held from rotation to thereby effect rotation of the churn barrel and the other of which is adapted when held from rotation to thereby prevent the rotation of the churn barrel, a brake for each wheel, means to operate each brake and an interlocking device between the two brake-operating means adapted to lock either means from movement to braking position when the other is in braking position.

5. In a churn, the combination with the churn barrel, a driving shaft and power transmission mechanism connecting the driving shaft with the churn barrel, said mechanism including planetary gearing and three brake wheels, two of which are adapted when held from rotation to thereby effect rotation of the churn barrel at different speeds during churning and working respectively and the third of which is adapted when held from rotation to prevent the rotation of the churn barrel, a brake for each wheel, means to operate each brake and an interlocking device between the churn - rotation - preventing brake - operating means and the churning and working brake-operating means adapted to lock the last named means from movement to braking position when the churn-rotation-preventing means is in braking position and vice versa.

6. In a churn, the combination with the churn barrel, a driving shaft and power transmission mechanism connecting the driving shaft with the churn barrel, said mechanism including planetary gearing and three brake wheels, two of which are adapted when held from rotation to thereby effect rotation of the churn barrel at different speeds during churning and working respectively and the third of which is adapted when held from rotation to prevent the rotation of the churn barrel, a brake for each wheel, means to operate each brake and interlocking mechanism between the several brake-operating means adapted to lock any of the three brake-operating means from moving into braking position when either of the other two brake-operating means is in braking position.

7. In a churn, the combination with the churn barrel, a driving shaft and power transmission mechanism connecting the driving shaft with the churn barrel, said mechanism including planetary gearing and two brake wheels which are adapted when held from rotation to thereby effect rotation of the churn barrel at different speeds during churning and working respectively, a brake for each wheel, two brake levers, mechanisms connected with the respective brake wheels and operable by the respective levers to apply and release the brakes, and an interlocking device between the churning brake-operating means and the working brake-operating means comprising opposing orifices in the respective levers and a pin having bevelled ends adapted, when both brake levers are in inoperative position, to extend into the orifices of both brake levers, said pin being adapted, when either brake is moved away from inoperative position, to be moved out of the orifice of said brake lever and projected sufficiently far into the orifice of the other brake lever to lock it from movement.

8. In a churn, the combination with the churn barrel, a driving shaft and power transmission mechanism connecting the driving shaft with the churn barrel, said mechanism including planetary gearing and two brake wheels, one of which is adapted, when held from rotation, to thereby effect rotation of the churn barrel, and the other of which is adapted, when held from rotation, to thereby prevent the rotation of the churn barrel, a brake for each wheel, two brake levers, mechanisms connected with the respective brake wheels and operable by the respective levers to apply and release the brakes, and an interlocking device between the two brake-operating means comprising pins engageable with orifices in the respective brake levers and operative connections between the pins, either pin being movable, when the corresponding brake lever is moved out of inoperative position, to shift said operative connections into position to move the other pin into locking engagement with the other brake lever.

CYRUS HOWARD HAPGOOD.